(12) United States Patent
Yu

(10) Patent No.: US 11,254,444 B2
(45) Date of Patent: Feb. 22, 2022

(54) GIMBAL, PHOTOGRAPHING APPARATUS HAVING SAME, AND UNMANNED AERIAL VEHICLE

(71) Applicant: AUTEL ROBOTICS CO., LTD, Guangdong (CN)

(72) Inventor: Chun Yu, Guangdong (CN)

(73) Assignee: AUTEL ROBOTICS CO., LTD, Shenzhen (CN)

( * ) Notice: Subject to any disclaimer, the term of this patent is extended or adjusted under 35 U.S.C. 154(b) by 77 days.

(21) Appl. No.: 16/704,498

(22) Filed: Dec. 5, 2019

(65) Prior Publication Data

US 2020/0108947 A1    Apr. 9, 2020

Related U.S. Application Data

(63) Continuation of application No. PCT/CN2018/078932, filed on Mar. 14, 2018.

(51) Int. Cl.
| | | |
|---|---|---|
| *B64D 47/08* | (2006.01) | |
| *B64C 39/02* | (2006.01) | |
| *G03B 15/00* | (2021.01) | |
| *G03B 17/56* | (2021.01) | |

(52) U.S. Cl.
CPC ............ *B64D 47/08* (2013.01); *B64C 39/024* (2013.01); *G03B 15/006* (2013.01); *G03B 17/561* (2013.01); *B64C 2201/027* (2013.01); *B64C 2201/127* (2013.01)

(58) Field of Classification Search
USPC ......................................................... 396/13
See application file for complete search history.

(56) References Cited

U.S. PATENT DOCUMENTS

| | | | |
|---|---|---|---|
| 3,421,721 A | 1/1969 | Miller | |
| 2017/0192342 A1* | 7/2017 | Liu | ................... H04N 5/2253 |
| 2018/0003340 A1* | 1/2018 | Tian | ..................... H02K 7/14 |
| 2018/0149949 A1* | 5/2018 | Kim | .................. F16M 13/022 |
| 2018/0210322 A1* | 7/2018 | Malukhin | ............. G06T 19/006 |
| 2018/0373127 A1* | 12/2018 | Peng | .................... G03B 15/006 |

(Continued)

FOREIGN PATENT DOCUMENTS

| | | |
|---|---|---|
| CN | 102602543 A | 7/2012 |
| CN | 205418138 U | 8/2016 |
| CN | 205427415 U | 8/2016 |

(Continued)

OTHER PUBLICATIONS

International Search Report and Written Opinion dated Jun. 21, 2018; PCT/CN2018/078932.

(Continued)

*Primary Examiner* — Rodney E Fuller

(57) ABSTRACT

An embodiment of the present invention provides a gimbal, a photographing apparatus having same, and an unmanned aerial vehicle. The gimbal includes at least two drive assemblies connected successively; a carrying housing configured to mount the photographing apparatus; one drive assembly of the at least two drive assemblies being mounted within the carrying housing, and the at least two drive assemblies being capable of driving the carrying housing to rotate toward at least two directions, so as to adjust an angle of the photographing apparatus from the at least two directions.

17 Claims, 2 Drawing Sheets

(56) References Cited

U.S. PATENT DOCUMENTS

2019/0155130 A1* 5/2019 Liao .................... F16M 11/105
2020/0041879 A1* 2/2020 Li ......................... F16M 11/12

FOREIGN PATENT DOCUMENTS

| CN | 106257126 A | 12/2016 |
| CN | 205781864 U | 12/2016 |
| CN | 106464079 A | 2/2017 |

OTHER PUBLICATIONS

First Chinese Office Action dated Apr. 26, 2019; Appln No. 201710423043.4.
International Search Report dated Jun. 21, 2018; PCT/CN2018/078932.

* cited by examiner

US 11,254,444 B2

GIMBAL, PHOTOGRAPHING APPARATUS HAVING SAME, AND UNMANNED AERIAL VEHICLE

This application is a continuation of International Patent Application No. PCT/CN20181078932 filed on Mar. 14, 2018, which claims the priority to Chinese Patent Application No. 201710423043.4 filed on Jun. 7, 2017, which is incorporated by reference herein in its entirety.

BACKGROUND

Technical Field

The present invention relates to the field of an aviation aircraft, and in particular, to a gimbal, a photographing apparatus having same, and an unmanned aerial vehicle.

Related Art

An unmanned aerial vehicle refers to an unmanned aircraft using a radio remote control device and a self-contained program control apparatus. The unmanned aerial vehicle is initially used in a military field, and then gradually covers a consumption field with the scientific development. At present, the unmanned aerial vehicle is widely used in many fields such as street photography, film and television play photography, environment monitoring, geological surveying, map drawing, and monitoring of agriculture, forestry and animal husbandry, etc.

Generally, a gimbal for mounting and fixing a camera is disposed under a rack of the unmanned aerial vehicle. The gimbal may be further configured to adjust an attitude of the camera to achieve a better photographing effect. However, an existing gimbal has a large overall dimension and a large volume, impeding miniaturization of the unmanned aerial vehicle.

SUMMARY

An objective of the present invention is to resolve the foregoing technical problems and provide a gimbal with a reduced overall dimension and a compact structure.

Another objective of the present invention is to provide a photographing apparatus having the gimbal.

Still another objective of the present invention is to provide an unmanned aerial vehicle having the photographing apparatus, The present invention provides a gimbal, including:

at least two drive assemblies, the at least two drive assemblies being connected successively; and a carrying housing configured to mount a photographing apparatus;

one of the at least two drive assemblies being mounted within the carrying housing, and the at least two drive assemblies being capable of driving the carrying housing to rotate toward at least two directions, so as to adjust an angle of the photographing apparatus from the at least two directions.

Optionally, two mounting holes that are spaced apart from each other and that are configured to mount a camera lens are disposed on the carrying housing. Hole axes of the two mounting holes are parallel to each other. A drive assembly mounted within the carrying housing is located at an intermediate position of a line connecting the two hole axes, Optionally, the two mounting holes are symmetrical relative to a transverse centerline of the carrying housing, and a center of gravity of the drive assembly mounted within the carrying housing is located on the transverse centerline.

Optionally, the at least two drive assemblies are three drive assemblies, respectively a first drive assembly, a second drive assembly, and a third drive assembly. The first drive assembly is configured to be connected to an external bracket, the second drive assembly is connected to the first drive assembly, and the third drive assembly is connected to the second drive assembly and is mounted within the carrying housing, The first drive assembly is capable of driving the carrying housing to rotate toward a first direction, the second drive assembly is capable of driving the carrying housing to rotate toward a second direction, and the third drive assembly is capable of driving the carrying housing to rotate toward a third direction, the first direction, the second direction and the third direction being perpendicular to each other, Optionally, the first drive assembly includes a first mating portion and a first connecting portion. The first mating portion is configured to be connected to an external bracket. A first driver is disposed inside the first mating portion. A movable end of the first driver is connected to an end of the first connecting portion, and the other end of the connecting portion is connected to the second drive assembly. The first driver drives the first connecting portion to rotate about a first axis, the first axis being parallel to an axis of the first mating portion.

Optionally, the second drive assembly includes a second mating portion and a second connecting portion, the second mating portion being fixed to the first connecting portion, a second driver being disposed inside the second mating portion, a movable end of the second driver being connected to an end of the second connecting portion, the other end of the second connecting portion being connected to the third drive assembly, and the second driver driving the second connecting portion to rotate about a second axis, the second axis being perpendicular to the first axis.

Optionally, the second connecting portion is a flat arm, and the second connecting portion has a length at most less than half a length of the first connecting portion.

Optionally, the third drive assembly includes a third mating portion fixedly connected to the second connecting portion, a third drive being disposed inside the third mating portion, a movable end of the third drive being connected to the carrying housing and driving the carrying housing to rotate relative to a third axis, and the third axis being respectively perpendicular to the second axis and the first axis.

The present invention further provides a photographing apparatus, including a photographing device and the foregoing gimbal. The photographing device has two photographing lenses, the two photographing lenses being respectively mounted in two mounting holes of the housing.

The present invention further provides an unmanned aerial vehicle, including a body and the foregoing photographing apparatus, the photographing apparatus being mounted on the body. Technical solutions provided in the embodiments of the present disclosure may include the following beneficial effects.

According to the gimbal of the present invention, one of the at least two drive assemblies is mounted in the carrying housing that carries the photographing apparatus, so that the size of the gimbal is reduced, making the overall structure of the gimbal more compact, and facilitating miniaturization of the gimbal.

In addition, two mounting holes for mounting the photographing lens are disposed on the carrying housing of the gimbal of the present invention, and the drive assembly mounted within the carrying housing is located at an intermediate position of a line connecting hole axes of the two mounting holes, so that the photographing lens mounted in the two mounting holes are balanced in weight relative to the drive assembly (such as the third drive assembly), thereby increasing the stability of the photographing lens, and eliminating the shake of the photographing lens during flight of the unmanned aerial vehicle or movement of the handheld photographing device.

It should be understood that the above general descriptions and the following detailed descriptions are merely exemplary, and cannot limit the present disclosure.

BRIEF DESCRIPTION OF THE DRAWINGS

To describe the technical solutions in the embodiments of the present invention or in the prior art more clearly, the accompanying drawings herein are incorporated into the specification and constitute a part of the specification, illustrate the embodiments of the present invention, and are used for explaining the principles of the present invention together with the specification. Apparently, the accompanying drawings in the following description merely show some embodiments of the present invention, and persons of ordinary skill in the art may still derive drawings of other embodiments from these accompanying drawings without creative effort.

DETAILED DESCRIPTION

To further explain the principle and structure of the present invention, preferred embodiments of the present invention will be described in detail with reference to the accompanying drawings.

In the description of the present invention, it should be noted that, the terms such as "first", "second", and "third" are used for the purpose of description only and are not to be construed as indicating or implying relative importance.

In the description of the present invention, it should be noted that, unless otherwise clearly specified and defined, terms such as "installation", "interconnection", and "connection" shall be understood in a broad sense, for example, may be a fixing connection, a detachable connection, an integral connection, a mechanical connection, an electrical connection, a direct connection, an indirect connection by using an intermediate medium, and communication between interiors of two components. Those of ordinary skill in the art can understand specific meanings of the terms in the present invention according to specific situations.

The present invention provides a photographing apparatus including a gimbal and a photographing device in the present invention. The photographing device has two photographing lens, and the two photographing lens may have a same type or different types. For example, one of the photographing lenses is an infrared lens or a thermal imaging lens, and the other is an ordinary visible light lens. Types of the two photographing lenses may be selected according to a purpose of photographing. The photographing apparatus may be applied to an unmanned aerial vehicle, for example, the photographing apparatus is mounted to a body of the unmanned aerial vehicle. The photographing apparatus may also be applied to a handheld photographing device, for example, the photographing apparatus is mounted to a handheld photography stick.

Figure 1:
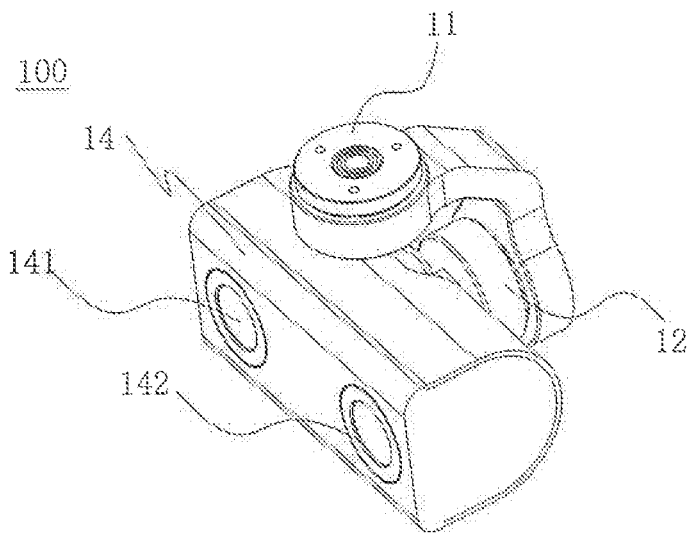
FIG. 1 is a schematic structural diagram of a combined gimbal according to the present invention.
Figure 2:
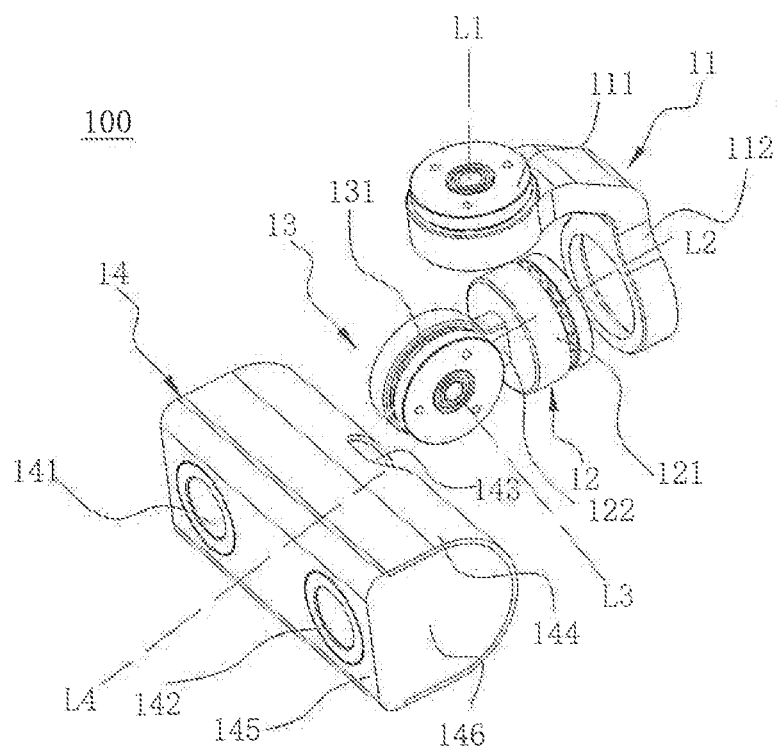
FIG. 2 is a schematic structural diagram of a disassembled gimbal according to the present invention.

In an embodiment, as shown in FIG. 1 and FIG. 2, FIG. 1 is a schematic structural diagram of a combined gimbal according to the present invention, and FIG. 2 is a schematic structural diagram of a disassembled gimbal according to the present invention. A gimbal 100 of the present invention includes a first drive assembly 11, a second drive assembly 12, a third drive assembly 13, and a carrying housing 14 for mounting a photographing device. The third drive assembly 13 is mounted within the carrying housing 14.

The three drive assemblies are connected successively, that is, the first drive assembly 11 is connected to the second drive assembly 12, and the second drive assembly 12 is connected to the third drive assembly 13, which are respectively configured to adjust an attitude or an angle of the carrying housing 14 (that is, a photographing device within the carrying housing 14), so that shaking of the gimbal during photographing caused due to flight of the unmanned aerial vehicle or movement of the handheld photographing device is eliminated, and a photographing angle of the photographing device is adjusted.

The first drive assembly 11 includes a first mating portion 111 and a first connecting portion 112, the first connecting portion 112 being rotatably mounted to the first mating portion 111. The first mating portion 111 is configured to be connected to an external bracket. The external bracket may be a body of the unmanned aerial vehicle, or may be a handheld photography stick of the handheld photographing device. A first driver (not shown) is disposed inside the first mating portion 111, a movable end of the first driver being connected to an end of the first connecting portion 112, and the other end of the first connecting portion 112 being connected to the second drive assembly 12. The first connecting portion 112 may be a curved shaft arm as shown in FIG. 2 extending from a bottom end of the first mating portion 111 to the second drive assembly 12.

The first driver is capable of driving the first connecting portion 112 to rotate about a first axis L1. While the first connecting portion 112 rotates about the first axis L1, the first connecting portion 112 drives the second drive assembly 12, the third drive assembly 13, and the carrying housing 14 to rotate about the first axis L1, so as to adjust an attitude or an angle of the carrying housing 14 in a first direction. The first axis L1 is parallel to or coincident with an axis of the first mating portion 111. The first axis L1 may be a translation axis or a heading axis of the gimbal 100. The first driver is a motor, which may be a brushless motor, a brushed motor, or other types of motors. The movable end is a rotor of the motor, and the first drive assembly 11 is a translation shaft drive assembly.

Definitely, in other embodiments, the first drive assembly 11 may also be a roll axis drive assembly or a pitch shaft drive assembly.

In addition, in order to control a rotation speed and a rotation direction of the first driver, other electrical components such as a controller may further be disposed in the mating portion 111, the first driver being electrically connected to the controller.

The second drive assembly 12 includes a second mating portion 121 and a second connecting portion 122, the second mating portion 121 being fixed to the first connecting portion 112, and the second connecting portion 122 being rotatably mounted to the second mating portion 121. A second driver (not shown) is disposed inside the second mating portion 121, a movable end of the second drive being connected to an end of the second connecting portion 122, and the other end of the second connecting portion 122 being connected to the third drive assembly 13. The second connecting portion 122 may be a flat arm as shown in FIG. 2 extending from a top end of the second mating portion 121 to the third drive assembly 13. The flat arm is substantially parallel to an axis of the second mating portion 121. Because the third drive assembly 13 may be directly mounted within the carrying housing 14, a length of the flat arm may be appropriately shortened. For example, the flat arm has a length less than half a length of the first connecting portion 112, or even less, for example, the length may be a third of the length of the first connecting portion 112. Dramatic reduction of the length of the flat arm can reduce the overall size of the gimbal to a certain extent, making the overall structure of the gimbal more compact, and facilitating volume miniaturization of the gimbal and the unmanned aerial vehicle.

The second driver is capable of driving the second connecting portion 122 to rotate about a second axis L2. While the second connecting portion 122 rotates about the second axis L2, the second connecting portion 122 drives the third drive assembly 13 and the carrying housing 14 to rotate about the second axis L2, so as to adjust an attitude or an angle of the carrying housing 14 in a second direction. The second axis L2 is parallel to or coincident with an axis of the second mating portion 121, and the second axis L2 is perpendicular to the first axis L1. The second axis L2 may be a roll axis of the gimbal 100. The second driver is a motor, which may be a brushless motor, a brushed motor, or other types of motors. The movable end is a rotor of the motor. The second drive assembly 12 is a roll axis drive assembly. Definitely, in other embodiments, the second drive assembly 12 may also be a translation axis drive assembly or a pitch axis drive assembly, The second driver may be electrically connected to a controller in the first mating portion 111 to control a rotation speed and a rotation direction of the second driver through the controller.

Figure 3:
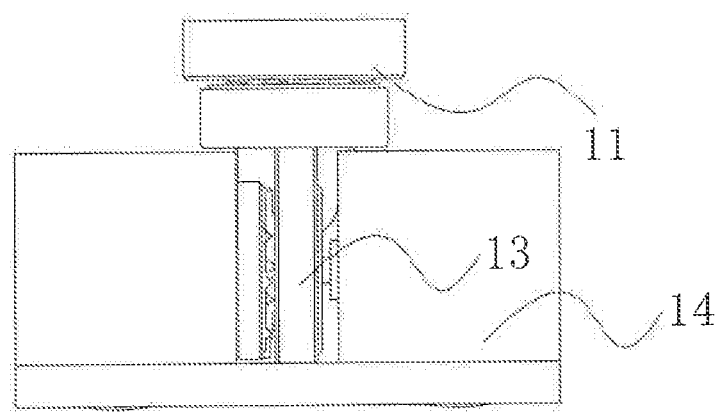
FIG. 3 is a clear schematic side view of a portion of a third drive assembly mounted within a carrying housing.

The third drive assembly 13 includes a third mating portion 131, the third mating portion 131 being fixedly connected to the second connecting portion 122. With reference to FIG. 3, FIG. 3 is a clear schematic side view of a portion of a third drive assembly mounted within a carrying housing. The third mating portion 131 is mounted within the carrying housing 14, and a movable end of the third mating portion 131 is connected to the carrying housing 14 to drive the carrying housing 14 to rotate about the third axis L3 relative to the third mating portion 131, so as to adjust an attitude or an angle of the carrying housing 14 in a third direction. The third axis L3 is parallel or coincident with an axis of the third mating portion 131, and the third axis L3 is respectively perpendicular to the second axis L2 and the first axis L1.

The third axis L3 may be a pitch axis of the gimbal 100. The third drive is a motor, which may be a brushless motor, a brushed motor, or other types of motors. The movable end is a rotor of the motor. The third drive assembly 13 may be a pitch axis drive assembly. Definitely, in other embodiments, the third drive assembly 13 may also be a translation axis drive assembly or a roll axis drive assembly.

The foregoing first direction may be a rotation direction about the first axis L1, the second direction may be a rotation direction about the second axis L2, and the third direction may be a rotation direction about the third axis L3.

The third driver may be electrically connected to a controller in the first mating portion 111 to control a rotation speed and a rotation direction of the third driver through the controller.

The carrying housing 14 includes a side wall 144, a vertical side wall 145, a bottom face 146, and a top face (not shown). The side wall 144, the vertical side wall 145, the bottom face 146, and the top face enclose a semi-circular cylinder. A cavity is formed in the carrying housing 14 for accommodating a photographing device and the third drive assembly 13. An opening 143 is disposed at a middle position of the side wall 144, the opening 143 being configured to accommodate the third drive assembly 13. Two spaced-apart mounting holes 141 and 142 are disposed on the vertical side wall 145 for mounting two photographing lenses of the photographing device. A hole axis of the mounting hole 141 and a hole axis of the mounting hole 142 are parallel to each other, and the mounting hole 141 and the mounting hole 142 are symmetrical relative to the transverse centerline L4 of the carrying housing 14.

In this embodiment, the side wall 144, the bottom face 146, and the top face are all arc-shaped. In other embodiments, the side wall 144, the bottom face 146, and the top face may further be any of geometric shapes such as a circle, a rectangle, and a polygon.

The third drive assembly 13 is mounted within the carrying housing 14 through the opening 143, and the third drive assembly 13 is located at an intermediate position of a line connecting the hole axis of the mounting hole 141 and the hole axis of the mounting hole 142. In particular, the center of gravity of the third drive assembly 13 is located on an axis of symmetry (that is, the transverse centerline L4) of the mounting hole 141 and the mounting hole 142.

The third drive assembly 13 is disposed at a middle position of a line connecting the two hole axes, that is, is located at a middle position between two photographing lenses of the photographing device, so that the two photographing lenses of the photographing device are balanced in weight relative to the third drive assembly 13, improving stability of the photographing lens, eliminating shaking of the photographing lens during flight of the unmanned aerial vehicle or movement of the handheld photographing device, and adjusting a photographing angle of the photographing device.

Further, during use of the gimbal, the three drive assemblies may work simultaneously to simultaneously adjust the angle of the photographing lens from a plurality of directions.

In another embodiment, the gimbal of the present invention may include two drive assemblies. With reference to FIG. 2, one of the drive assemblies 13 is mounted to the carrying housing, and the other drive assembly 12 is configured to be connected to an external bracket. In this embodiment, the drive assembly 11 is omitted. According to the gimbal in this embodiment, the attitude or angle of the carrying housing is adjusted from two dimensions to reduce shaking of the photographing lens. In the embodiment, other structures of the gimbal are similar to the structure in the previous embodiment, and a main difference is that three drive assemblies are replaced with two drive assemblies.

The gimbal structure of the present invention may also include more than three drive assemblies, and a quantity of drive assemblies is not limited thereto. Any equivalent structural change made using the description and drawings of the present invention shall fall within the protection scope of the present invention.

Through the gimbal of the present invention, one of at least two drive assemblies are mounted within the carrying housing that carries the photographing apparatus, so that the size of the gimbal is reduced, making the overall structure of the gimbal more compact, and facilitating miniaturization of the gimbal.

In addition, through the gimbal of the present invention, one of the at least two drive assemblies is mounted within the carrying housing of the photographing apparatus, which can greatly reduce the length of the second connecting portion of the second drive assembly, and can cause the length of the second connecting portion to be less than half the length of the first connecting portion. Therefore, the size of the gimbal is further reduced, making the overall structure of the gimbal more compact.

Two mounting holes for mounting the photographing lens are disposed on the carrying housing of the gimbal of the present invention, and the drive assembly mounted within the carrying housing is located at an intermediate position of a line connecting hole axes of the two mounting holes, so that the photographing lens mounted to the two mounting holes are balanced in weight relative to the drive assembly (such as the third drive assembly), thereby improving the stability of the photographing lens, and eliminating the shaking of the photographing lens during flight of the unmanned aerial vehicle or movement of the handheld photographing device.

The above are only preferred feasible embodiments of the present invention, and are not intended to limit the protection scope of the present invention. Any equivalent structural changes made based on the contents of the specification and the accompanying drawings of the present invention shall all fall within the protection scope of the present invention.

What is claimed is:

1. A gimbal, comprising:
at least two drive assemblies connected successively; and
a carrying housing configured to mount a photographing apparatus; wherein
one of the at least two drive assemblies is mounted within the carrying housing, and the at least two drive assemblies drive the carrying housing to rotate toward at least two directions, so as to adjust an angle of the photographing apparatus from the at least two directions, and
wherein two mounting holes that are spaced apart from each other and that are configured to mount a camera lens are disposed on the carrying housing, hole axes of the two mounting holes being parallel to each other, and the drive assembly mounted within the carrying housing being located at an intermediate position of a line connecting the two hole axes.

2. The gimbal according to claim 1, wherein the two mounting holes are symmetrical relative to a transverse centerline of the carrying housing, a center of gravity of the drive assembly mounted within the carrying housing being located on the transverse centerline.

3. The gimbal according to claim 1, wherein the at least two drive assemblies are three drive assemblies, respectively a first drive assembly, a second drive assembly, and a third drive assembly, the first drive assembly being configured to be connected to an external bracket, the second drive assembly being connected to the first drive assembly, and the third drive assembly being connected to the second drive assembly and mounted within the carrying housing; wherein
the first drive assembly drives the carrying housing to rotate toward a first direction, the second drive assembly drives the carrying housing to rotate toward a second direction, and the third drive assembly drives the carrying housing to rotate toward a third direction, the first direction, the second direction, and the third direction being perpendicular to each other.

4. The gimbal according to claim 3, wherein the first drive assembly comprises a first mating portion and a first connecting portion, the first mating portion being configured to be connected to an external bracket, a first driver being disposed inside the first mating portion, a movable end of the first driver being connected to an end of the first connecting portion, and the other end of the first connecting portion being connected to the second drive assembly, wherein the first driver drives the first connecting portion to rotate about a first axis, the first axis being parallel to an axis of the first mating portion.

5. The gimbal according to claim 4, wherein the second drive assembly comprises a second mating portion and a second connecting portion, the second mating portion being fixed to the first connecting portion, a second driver being disposed inside the second mating portion, a movable end of the second driver being connected to an end of the second connecting portion, and the other end of the second connecting portion being connected to the third drive assembly, wherein the second driver drives the second connecting portion to rotate about a second axis, the second axis being perpendicular to the first axis.

6. The gimbal according to claim 5, wherein the second connecting portion is a flat arm, the second connecting portion having a length less than half a length of the first connecting portion.

7. The gimbal according to claim 5, wherein the third drive assembly comprises a third mating portion fixedly connected to the second connecting portion, a third driver being disposed inside the third mating portion, a movable end of the third driver being connected to the carrying housing and driving the carrying housing to rotate relative to a third axis, and the third axis being respectively perpendicular to the second axis and the first axis.

8. A photographing apparatus, comprising a photographing device and a gimbal according to claim 1, wherein the photographing device has two photographing lenses, the two photographing lenses being respectively mounted in two mounting holes of a housing, and
wherein the gimbal comprising:
at least two drive assemblies, the at least two drive assemblies being connected successively; and
a carrying housing configured to mount a photographing apparatus; wherein
one of the at least two drive assemblies is mounted within the carrying housing, and the at least two drive assemblies is driving the carrying housing to rotate toward at least two directions, so as to adjust an angle of the photographing apparatus from the at least two directions, and
wherein two mounting holes that are spaced apart from each other and that are configured to mount a camera lens are disposed on the carrying housing, hole axes of the two mounting holes being parallel to each other, and the drive assembly mounted within the carrying housing being located at an intermediate position of a line connecting the two hole axes.

9. The photographing apparatus according to claim 8, wherein the two lenses are identical.

10. The photographing apparatus according to claim 8, wherein the two photographing lenses are different, one of the two lenses being an infrared lens or a thermal imaging lens, and the other photographing lens being a visible light lens.

11. An unmanned aerial vehicle, comprising a body and the photographing apparatus according to claim 8, the photographing apparatus being mounted on the body.

12. The photographing apparatus according to claim 8, wherein the two mounting holes are symmetrical relative to a transverse centerline of the carrying housing, a center of gravity of the drive assembly mounted within the carrying housing being located on the transverse centerline.

13. The photographing apparatus according to claim 8, wherein the at least two drive assemblies are three drive assemblies, respectively a first drive assembly, a second drive assembly, and a third drive assembly, the first drive assembly being configured to be connected to an external bracket, the second drive assembly being connected to the first drive assembly, and the third drive assembly being connected to the second drive assembly and mounted within the carrying housing; wherein the first drive assembly drives the carrying housing to rotate toward a first direction, the second drive assembly is driving the carrying housing to rotate toward a second direction, and the third drive assembly drives the carrying housing to rotate toward a third direction, the first direction, the second direction, and the third direction being perpendicular to each other.

14. The photographing apparatus according to claim 8, wherein the first drive assembly comprises a first mating portion and a first connecting portion, the first mating portion being configured to be connected to an external bracket, a first driver being disposed inside the first mating portion, a movable end of the first driver being connected to an end of the first connecting portion, and the other end of the first connecting portion being connected to the second drive assembly, wherein the first driver drives the first connecting portion to rotate about a first axis, the first axis being Parallel to an axis of the first mating portion.

15. The photographing apparatus according to claim 8, wherein the second drive assembly comprises a second mating portion and a second connecting portion, the second mating portion being fixed to the first connecting portion, a second driver being disposed inside the second mating portion, a movable end of the second driver being connected to an end of the second connecting portion, and the other end of the second connecting portion being connected to the third drive assembly, wherein the second driver drives the second connecting portion to rotate about a second axis, the second axis being perpendicular to the first axis.

16. The photographing apparatus according to claim 8, wherein the second connecting portion is a flat arm, the second connecting portion having a length less than half a length of the first connecting portion.

17. The photographing apparatus according to claim 8, wherein the third drive assembly comprises a third mating portion fixedly connected to the second connecting portion, a third driver being disposed inside the third mating portion, a movable end of the third driver being connected to the carrying housing and driving the carrying housing to rotate relative to a third axis, and the third axis being respectively perpendicular to the second axis and the first axis.

* * * * *